Patented Jan. 9, 1923.

1,442,002

UNITED STATES PATENT OFFICE.

FREDERICK REISIG, SR., OF BARNESVILLE, PENNSYLVANIA.

ROOFING MATERIAL.

No Drawing. Application filed January 11, 1922. Serial No. 528,487.

*To all whom it may concern:*

Be it known that FREDERICK REISIG, Sr., a citizen of the United States, residing at Barnesville, in the county of Schuylkill and State of Pennsylvania, has invented certain new and useful Improvements in Roofing Materials, of which the following is a specification.

This invention relates to a coating composition which may be applied to either wood or metal roofs and is designed to provide a protecting covering which will adhere to the surface to which it is applied, will exclude rain and will not be affected by sudden changes of temperature or extreme heat or cold.

The invention is further designed with the idea of providing a composition which may readily be formulated by such individuals as farmers or others who wish to make a waterproof coating for their barns or other buildings without going to the expense of buying large quantities from manufacturers of roof coatings at high prices.

The invention is further designed to provide a coating composition which may be quickly mixed and easily applied by unskilled workmen.

In formulating the mixture or combining the ingredients thereof, I first provide a yeast or fermenting mixture of the following ingredients in the proportionate quantities indicated.

1 qt. of fresh cow manure.
1 qt. of chicken manure.
1 qt. of mashed half rotten potatoes.
1 pt. of mashed half rotten apples.
½ pt. of fine cattle salt.
½ gal. of iron water.

Secondly I prepare a waterproofing mixture of the following ingredients in the quantities indicated.

¼ pk. of soot.
3½ pks. of coal ashes sifted through a fine mesh screen.
½ peck of wood ashes.
½ pk. of lime.
½ bu. of sand.
¼ pk. of cement.

With reference to the ingredients above mentioned, I have found that cider may be substituted for apples where the latter are not obtainable, answering well the same purpose. With reference to the use of yeast, it is preferred that the yeast be aged two or three days before mixing with the other ingredients. As to the use of wood and coal ashes, it often occurs that wood ash will be already found mixed with the coal ash, in which case it will be unnecessary to add separate quantities of each, and while I have referred broadly to sand, brick sand if obtainable is much preferred as it possesses the quality of color as well as that of ordinary sand. The iron water as used in connection with my composition is made by placing a number of rusted irons in a barrel of rain water and after allowing the same to stand for a considerable length of time the rust scales from the iron bars will come in contact with the water and thereby cause the rain water in the barrel to become the color of rust. After the rust water has been left standing for a considerable length of time the same is then ready for use in connection with the remaining ingredients of my compound.

For a surface to be treated with the composition, I take five parts of the fermenting mixture to three parts of the composition and thoroughly mix the same and after first applying a coating of coal tar by a brush to the roof or other surface, the mixture is immediately applied with a tool such as a smooth spade and properly spread thereby, this immediate application of the mixture tending to hold the tar and prevent its flowing. If the weather is quite warm, it may be necessary to sprinkle the applied mixture with a solution of clay and rain water. When the thus applied coating is exposed to dew, frost or rain, it becomes set or hardened and will thereafter be proof against moisture or changes in temperature.

Having thus described my invention, what I claim as new and desire to protect by Letters Patent is:—

A roofing composition formed of the following ingredients to wit:—one part consisting of one quart of fresh cow manure, one pint of chicken manure, one quart of mashed half rotten potatoes, one pint of mashed half rotten apples, one-half pint of fine cattle salt and one-half gallon of iron water to one part consisting of one-quarter peck of soot, three and one-quarter pecks of finely sifted coal ashes, one-half peck of wood ashes, one-half peck of lime, one-half bushel of sand and one-quarter peck of cement, the ingredients of each part being first thoroughly mixed together and said parts being subsequently brought together and thoroughly mixed.

In testimony whereof I affix my signature.

FREDERICK REISIG, Sr.